US012472511B1

(12) United States Patent
MacGowan

(10) Patent No.: US 12,472,511 B1
(45) Date of Patent: Nov. 18, 2025

(54) METHOD AND APPARATUS FOR ELECTROSTATIC SEPARATION OF GLANDULAR TRICHOMES

(71) Applicant: Charles MacGowan, Miami, FL (US)

(72) Inventor: Charles MacGowan, Miami, FL (US)

( * ) Notice: Subject to any disclaimer, the term of this patent is extended or adjusted under 35 U.S.C. 154(b) by 0 days.

(21) Appl. No.: 18/654,997

(22) Filed: May 3, 2024

Related U.S. Application Data

(60) Provisional application No. 63/594,535, filed on Oct. 31, 2023.

(51) Int. Cl.
*B03C 7/12* (2006.01)
*B03C 7/00* (2006.01)

(52) U.S. Cl.
CPC ................ *B03C 7/12* (2013.01); *B03C 7/006* (2013.01)

(58) Field of Classification Search
CPC B03C 7/12; B03C 7/006; B03C 7/026; B03C 7/08
USPC .......................................................... 209/127
See application file for complete search history.

(56) References Cited

U.S. PATENT DOCUMENTS 1,744,967 A * 1/1930 Rothwell .................. B03C 7/08 209/40
3,143,492 A * 8/1964 Bullock .................... B03C 7/10 209/127.4
3,493,109 A 2/1970 Carta et al.
4,797,201 A 1/1989 Kuppers et al.
5,251,762 A * 10/1993 Taylor ........................ B03C 7/12 209/127.4
5,885,330 A * 3/1999 Lee ......................... B03C 7/006 209/127.4
6,942,752 B2 9/2005 Whitlock et al.
7,467,709 B2 12/2008 Whitlock et al.
8,541,709 B2 * 9/2013 Calin ........................ B03C 3/30 209/127.1
10,315,199 B2 6/2019 Rose
(Continued)

FOREIGN PATENT DOCUMENTS

CA 2934180 12/2017
EP 1192008 8/2006
(Continued)

OTHER PUBLICATIONS

J.Wang et al., https://www.sciencedirect.com/science/article/abs/pii/S1466856414001064, Jun. 27, 2014.
(Continued)

*Primary Examiner* — Michael Mccullough
*Assistant Examiner* — Jessica L Burkman
(74) *Attorney, Agent, or Firm* — MALLOY & MALLOY, PL

(57) ABSTRACT

The present invention discloses a method and apparatus for electrostatic separation of trichomes from plant biomass, addressing the limitations of conventional separation techniques. The method relies on differences in electrical properties of trichomes and plant material, utilizing an external electric field. A multi-component electrostatic separation assembly may prepare and separate one or more samples, thereby incorporating a dispensing component, a pipeline component, and a separation chamber comprising at least one electrode assembly. Moreover, the present invention may also provide for electrode assemblies that feature self-cleaning mechanisms.

25 Claims, 5 Drawing Sheets

(56) References Cited

U.S. PATENT DOCUMENTS

| | | | |
|---|---|---|---|
| 10,357,803 | B2 | 7/2019 | Greenwood |
| 2005/0103907 | A1 | 5/2005 | Bohm et al. |
| 2015/0140185 | A1 | 5/2015 | Rajabzadeh et al. |

FOREIGN PATENT DOCUMENTS

| | | |
|---|---|---|
| GB | 1152218 | 5/1969 |
| JP | H09267052 | 10/1997 |

OTHER PUBLICATIONS

Rybarczyk et al., https://www.mdpi.com/1424-8220/20/24/7201, Dec. 16, 2020.
Xing et al., https://doi.org/10.1016/j.ifset.2020.102480, Aug. 20, 2020.
Regulski et al., Automated test bench for research on electrostatic separation in plastic recycling application, Apr. 1, 2021.
Dascalescu, et al., Charges and Forces on Conductive Particles in Roll-Type Corona-Electrostatic Separators, Oct. 1, 1995.
Zhang et al., Measurements of Electrostatic Charging of Powder Mixtures in a Free-Fall Test Device, Jan. 1, 2015.
Ebersbach et al., https://doi.org/10.1186/s12870-018-1481-4, Jan. 1, 2018.
Frantisek Mach et al., Crucial factors of plastic mixtures separation in free-fall electrostatic separator: simulation and experimental testing, Jan. 1, 2018.
Lee et al., Design and Performance Evaluation of Triboelectrostatic Separation System for the Separation of PVC and PET Materials using a Fluidized Bed Tribocharger, Jan. 1, 2003.
Kim et al., Tribo-Electrostatic Beneficiation of Fly Ash for Ash Utilization, Jan. 1, 2001.
Flynn et al., Electrostatic Separation of Dry Granular Plant Based Food Materials, Mar. 1, 2017.
Xing et al., https://doi.org/10.1111/jfpe.13575, Sep. 22, 2020.
Das et al., https://www.researchgate.net/publication/285896541, Oct. 1, 2005.
Jue Wang, Electrostatic separation for functional food ingredient production, Mar. 16, 2016.
Mach et al., http://dx.doi.org/10.1016/j.cam.2014.02.009, Jan. 1, 2014.
Miloudi et al., https://www.researchgate.net/publication/264587703, Nov. 1, 2013.
Buda et al., Experimental Study of the Tribocharging Process of Plastic Granular Materials on a Vibratory Feeder Device, Oct. 1, 2013.
Kamal et al., https://doi.org/10.1016/B978-0-12-817686-3.00013-X, Jan. 1, 2022.
G. Barbosa et al., Physical Properties, Processing, and Functionality, Jan. 1, 2005.
Miloudi et al., https://www.researchgate.net/publication/276422006, Sep. 1, 2015.
Dodbiba et al., Combination of Triboelectrostatic Separation and Air Tabling for Sorting Plastics from a Multi-Component Plastic Mixture, Jan. 1, 2003.
Sweers et al., www.elsevier.com/locate/jfoodeng, Jan. 1, 2022.
Kacerovsky, et al., Experimental Electrostatic Separator for Plastic Mixture, Sep. 6, 2015.
Kelly et al., The Theory of Electrostatic Separations: a Review Part III. The Separation of Particles, Jan. 1, 1989.
J Wang et al., http://dx.doi.org/10.1016/j.ifset.2015.12.020, Dec. 30, 2015.
Silveira et al., https://doi.org/10.1016/j.psep.2017.12.019, Feb. 1, 2018.
Jia Li, https://www.researchgate.net/publication/266676412, Jun. 1, 2012.
Luga et al., Optimal High-Voltage Energization of Corona-Electrostatic Separators, Jan. 1, 1998.
Miloudi et al., https://www.researchgate.net/publication/260692940, Mar. 1, 2013.
Dascalescu et al., https://iopscience.iop.org/article/10.1088/0022-3727/27/6/023/meta, Jan. 1, 1994.
Mirkowska et al., https://link.springer.com/article/10.1007/s00501-016-0515-1, Aug. 5, 2016.
Mirkowska, Principal Factors of Contact Charging of Minerals, Jul. 8, 2016.
Xing et al., https://doi.org/10.1016/j.ifset.2018.08.014, Aug. 31, 2018.
Zou et al., https://doi.org/10.1038/s41467-019-09461-x, Jan. 1, 2019.
Tilmatine et al., https://www.researchgate.net/publication/224137446, Sep. 1, 2010.
Manouchehri et al., Review of Electrical Separation Methods, Feb. 1, 2000.
Conneely, et al., https://researchportal.scu.edu.au/10.25918/data. 112, Apr. 1, 2021.
Kim et al., Secretory Cavity Development in Glandular Trichomes of *Cannabis sativa* L. (Cannabaceae), Jan. 1, 1991.
J Wang et al., http://dx.doi.org/10.1016/j.seppur.2015.08.025, Aug. 17, 2015.
Tilmatine et al., https://www.researchgate.net/publication/224343828, Nov. 1, 2008.
Gruber et al., Electrostatic separation of soybean for protein concentration, Oct. 23, 2016.
Stokkermill, Electrostatic Separators E-Sorting, Jun. 11, 2015.
Muravnik, https://www.researchgate.net/publication/343118245, Jan. 1, 2020.
Benhafssa et al., https://www.researchgate.net/publication/277929195, Sep. 1, 2015.
Kelly et al., The Theory of Electrostatic Separations: a Review Part I. Fundamentals, Jan. 1, 1989.
Kelly et al., The Theory of Electrostatic Separations: a Review Part II. Particle Charging, Jan. 1, 1989.
Lyskawinski et al., https://doi.org/10.3390/en14061755, Mar. 22, 2021.
Lyskawinski et al., https://doi.org/10.3390/en15010019, Dec. 21, 2021.
Zhu Hong-Guang et al., Electrostatic separation technology for obtaining plant protein concentrates: A review, Trends in Food Science & Technology, Elsevier Science Publishers, GB, vol. 113, May 10, 2021 (May 10, 2021), pp. 66-76, XP086602299, ISSN: 0924-2244, DOI: 10.1016/J.TIF, May 10, 2021.
Chen Zhongwei et al., Triboelectric separation of aleurone cell-cluster from wheat bran fragments in nonuniform electric field, Food Research International, Elsevier, Amsterdam , NL, vol. 62, Mar. 3, 2014 (Mar. 3, 2014), pp. 111-120, XP028863529, ISSN: 0963-9969, DOI:10.1016/J, May 19, 2005.

* cited by examiner

METHOD AND APPARATUS FOR ELECTROSTATIC SEPARATION OF GLANDULAR TRICHOMES

CLAIM OF PRIORITY

The present non-provisional patent application hereby makes a claim of priority to an earlier filed and converted U.S. provisional patent application having Ser. No. 63/594,535 and a filing date of Oct. 31, 2023, which is hereby incorporated herewith in its entirety.

BACKGROUND OF THE INVENTION

Field of the Invention

The present invention is directed to a method and apparatus for electrostatic separation of glandular trichomes from plant biomass.

Description of the Related Art

In the realm of biology-within the overarching domain of natural sciences—and particularly within the field of botany, specialized hair-like structures known as glandular trichomes (hereinafter "trichomes")—which consist of a stalk and glandular head—can be found on the surface of certain plants. In this regard, the function of the glandular head of these trichomes is to secrete and store complex secondary metabolites and phytochemicals (e.g., terpenoids, phenylpropanoids, flavonoids, etc.) via secretory cells found therein. As such, and as a result of natural biological processes, these trichomes accumulate and contain large amounts of biological compounds which have widespread therapeutic, pharmaceutical, and nutraceutical applications. However, in order to obtain such trichomes—and thereby gain access to the biological compounds stored therein—the trichomes must be separated from the remaining plant material and meticulously collected.

One such currently available means and/or method to perform the requisite separation (i.e., the separation of plant material to procure the trichomes therein) is known as "wet fractionation," wherein certain techniques are used to separate components of a mixture or biomass while still in a wet or liquid state. Ice water extraction—one such form of wet fractionation wherein a botanical sample is repeatedly agitated in the presence of ice water to achieve separation via differences in specific gravity—brings about several negative consequences, such as the loss of valuable aromatic compounds (e.g., light oils, terpenes, etc.) in the ice water and, to avoid fungal propagation, the requirement to execute one or more drying methods. Accordingly, wet fractionation (and other forms of wet separation) may inevitably lead to the alteration and/or degradation of certain properties of the desired trichomes.

Another currently available means and/or method to perform the requisite separation is known as "dry fractionation," wherein certain techniques are used to separate components of a mixture or biomass while still in a dry or solid state. One such variation of dry fractionation-a methodology analogous to wet fractionation wherein plant biomass is pre-frozen and tumbled, sieved, and/or centrifuged to achieve separation via differences in density between the trichome heads and the remaining plant matter—also induces several negative consequences, such as extreme sensitivity to operating parameters such as temperature, humidity, and process duration. To achieve high product purity utilizing this methodology, the process must be performed in a cold, dry atmosphere for a short period of time—which does not lead to a high product yield (i.e., an increased product yield corresponds to a decrease in product purity). As such, this methodology essentially requires one or more additional processes to purify the product from any contaminants.

In this regard, one method to purify the product (i.e., the product resulting from dry fractionation methodologies) from such contaminants is known as "static tech," which generally involves the triboelectric charging of dried plant biomass on a nylon dry sift screen—thereby generating an electrostatic charge on the plant biomass and trichomes therein—and the collection (by hand) of such trichomes via use of vinyl gloves and/or parchment paper. However, similarly to the above-referenced methodologies of wet and dry fractionation, this purification process also has several drawbacks, such as being very labor-intensive, requiring highly trained personnel to correctly implement (e.g., for different grades of plant biomass), and not being scalable.

Accordingly, and as may be understood, while the aforementioned currently available means and methods to perform the requisite separation rely on differences in surface chemistry, electrical conductivity, and/or dielectric properties—generally consisting of a first step wherein any applicable particles are charged and a second step wherein mechanical separation is achieved using electrical, centrifugal, and/or gravitational forces—these means and methods are, at the very least, primitive and labor-intensive.

As such, a method and apparatus are therefore required to provide for an alternative means of separating glandular trichomes from a sample of plant biomass. Specifically, there is a need in the art for a method and apparatus designed to electrostatically separate trichomes and obtain such trichomes for therapeutic, pharmaceutical, and nutraceutical applications, wherein such a method and apparatus (1) effectively facilitate the electrostatic separation and collection of glandular trichomes from a sample of plant biomass; (2) enable the separation of trichomes from different grades of plant biomass based on their unique electrical properties, thereby eliminating the inefficiencies posed by the currently available means of separating trichomes from plant biomass; (3) allow for a more efficient and uniformly distributed triboelectric charge on the entirety of the sample of plant biomass; (4) control the degree to which particles of the sample of plant biomass acquire a triboelectric charge via manipulation of a variety of control variables (e.g., material flow rate, air flow temperature, humidity, velocity, etc.), thereby selectively increasing or decreasing product output and/or purity of trichomes; (5) provide a more effective separation by facilitating the uniform diffusion of triboelectrically charged particles into a corresponding electric field in a laminar manner, thereby minimizing particle-to-particle interaction and maximizing separatory effect; (6) provide a more effective separation by utilizing at least one elongated electrode assembly, thereby expanding the extent of the electric field, and, therefore, the effectiveness of the separation; (7) prevent the clogging of triboelectrically charged particles; and (8) prevent/further the formation of hydroxyl radicals. It is further desired that the present invention be (9) inexpensive; (10) scalable; (11) widely accessible; (12) able to be performed by non-specialized personnel or (13) automated and/or autonomously monitored, thereby allowing automatic control of the present invention to produce desired outcomes (i.e., high-purity, high-yield trichomes); and (14) available in stationary or mobile embodiments-thus allowing for widespread use in a variety of situational contexts.

SUMMARY OF THE INVENTION

In view of the disadvantages that come with using the aforementioned means and methodologies of separating glandular trichomes from samples of plant biomass, the present invention is directed to a method and apparatus for electrostatically separating trichomes from a sample of plant biomass wherein the method and apparatus rely on differences in the electrical properties (i.e., electrical conductivity and dielectric properties) of trichomes and trichome-bearing plant material to exhibit different particulate behavior when exposed to an external electric field—the method and apparatus further relying on the chemical composition of the sample of plant biomass rather than its physical composition. The present invention is thus directed to a method and apparatus for electrostatic separation of trichomes from plant biomass.

As used herein, the phrase "about" can be defined as what one skilled in the art would understand "about" to mean, and the term "about" includes a 5% tolerance on both lower and upper bounds, if applicable—and "about" is described only by way of non-limiting example.

In more specific terms, the apparatus for electrostatic separation of glandular trichomes may comprise an electrostatic separation assembly—the electrostatic separation assembly generally configured to prepare a sample of plant biomass for electrostatic separation and perform the requisite electrostatic separation of the trichomes from the sample of plant biomass. Generally, and by way of non-limiting example, a plurality of electrostatic separation assemblies may be connected together—either in parallel, in series, or both—to achieve varying degrees of separation. Moreover, and by way of additional non-limiting example, the electrostatic separation assembly may be adapted for mobile use via incorporation of one or more electrostatic separation assembly into the framework of a motor vehicle.

With regard to the electrostatic separation assembly itself, the electrostatic separation assembly may comprise a dispensing component, the dispensing component configured to dispense a first sample, the first sample comprising glandular trichomes. By way of non-limiting example, the dispensing component may be a vibrating dispenser, a jet sieve, a vacuum conveyor, or a cyclone feed.

With particular regard to the preparation of the first sample, however, the first sample May be prepared via exposing the sample of plant biomass to temperatures of ranging from about −20° C. to 20° C.—the temperature regulated by a device capable of heating and/or cooling—and a relative humidity—the relative humidity regulated by a device capable of humidifying and/or dehumidifying-ranging from about 30% to about 50%. Moreover, the first sample may further be prepared via application of a pressurized gas source, wherein the pressurized gas is selected from a plurality of gases including dry atmospheric air and dry inert gases. By way of non-limiting example, the first sample may comprise a particulate size ranging from about 20 to about 300 micrometers. By way of additional non-limiting example, the first sample's particulate size shall not exceed 300 micrometers—or, more preferably, 250 micrometers. By way of yet additional non-limiting example, the first sample's moisture content is monitored via sensor technologies for purposes of fine-tuning the preparation thereof. Accordingly, and in such embodiments wherein the first sample is prepared, upon completion of the preparation of the first sample, the first sample may be dispensed by the dispensing component.

The electrostatic separation assembly may also comprise a pipeline component, the pipeline component configured to triboelectrically generate an electrostatic charge on the first sample. By way of non-limiting examples, the pipeline component may be structurally configured in a spiral arrangement and may be made of silicone, vinyl, fluoroethyl polymers, or polytetrafloral ethylene. In such embodiments wherein the pipeline component is structurally configured in a spiral arrangement, the pipeline component may direct the flow of the first sample therethrough in an intensified manner via circular aerodynamic flow. By way of additional non-limiting example, the pipeline component may triboelectrically generate an electrostatic charge on the first sample via frictional contact between particles of the first sample or via frictional contact between particles of the first sample and the material of the pipeline component.

In at least some embodiments of the present invention, the electrostatic separation assembly may also comprise a flow regulation component, the flow regulation component configured to pneumatically control the flow of the first sample through the pipeline component. In such embodiments wherein the electrostatic separation assembly comprises a flow regulation component, the flow regulation component may be selected from a plurality of flow regulation components comprising air flow regulators, vibrating feeders, and vacuum control devices. By way of non-limiting example, in such embodiments wherein the electrostatic separation assembly comprises a flow regulation component, the flow regulation component may vary the flow rate from about 0.1 mg/min to about 10,000 g/min. By way of additional non-limiting example, the flow regulation component may be controlled or actuated via use of an electronic signal.

Furthermore, the electrostatic separation assembly may comprise a separation chamber comprising at least one electrode assembly, the separation chamber configured to facilitate the separation of the first sample via generation of an electric field. By way of non-limiting example, the at least one electrode assembly may be secured to the structural features of the separation chamber in a variety of fashions, thereby allowing variability in the relative magnitudes of the resultant electric field. Moreover, and by way of non-limiting example, the at least one electrode assembly may be made of a conductive material and may comprise a first electrode assembly—the first electrode assembly being positively or negatively charged. By way of additional non-limiting example, the at least one electrode assembly may comprise a first electrode assembly—the first electrode assembly being positively charged—and a second electrode assembly—the second electrode assembly being negatively charged. In either embodiment, the electrode(s) May be flat, curved, angled, or boxed, and the power source for the voltage may be supplied by electricity distribution lines, solar panels, wind turbines, batteries, power generators operated by fuel, and the like. By way of non-limiting examples, the voltage may comprise a variety of waveforms, such as sinusoidal, square, triangular, saw-tooth, or a mixture thereof; the voltage applied to the electrode(s) is at least about 3 kV and at most about 20 kV; and the frequency of the voltage applied is at least about 0 Hz and at most about 300 kHz. Further, in such embodiments wherein the at least one electrode assembly comprises a first electrode assembly and a second electrode assembly, the first electrode assembly may be oriented in an opposing arrangement, a symmetrical arrangement, or an asymmetrical arrangement with respect to the second electrode assembly; and the at least one electrode assembly may be coated in an insulating material, the insulating material selected from a plurality of insulating materials comprising electrical insulators, electrical semi-insulators, and dielectric materials. As may be understood, the generated electric field is inversely proportional to the distance between electrodes—and, as such, a parallel orientation is necessary to achieve a uniform electric field in the separation chamber.

Moreover, in at least some embodiments of the present invention, the electrostatic separation assembly may also comprise an injection component, the injection component configured to direct the first sample from the pipeline component into the separation chamber. In some embodiments of the present invention, the injection component may be a flow straightener, the flow straightener configured to constrict flow of the first sample from a turbulent flow into a laminar flow at the point of injection into the separation chamber. As may be understood, the laminar flow of the first sample may be adjusted via the shape of the injection component (e.g., a 3-millimeter aperture) and the flow rate of the first sample. In this regard, the injection component may constrict the flow of the first sample into the separation chamber, wherein the first sample will, via gravitational forces, free-fall through the separation chamber—and, therefore, be subjected to the electric field produced by the at least one electrode assembly (i.e., negatively charged particles will be attracted to the positively charged electrode, and, in instances wherein a second electrode assembly is employed, vice versa).

After separation of the trichomes from the first sample, and as may be understood, the trichomes need to be collected for any potential therapeutic, pharmaceutical, and/or nutraceutical applications. In some embodiments of the present invention, the trichomes may be collected directly from the at least one electrode assembly (i.e., the electrode assembly that attracts the negatively charged trichomes). In such embodiments, the purity of the collected trichomes is about 95%. In other embodiments of the present invention, the trichomes may be collected via one or more collection bins, wherein the trichomes are manually or automatically released from the applied electric field and, via gravitational forces, fall into the one or more collection bins.

In yet additional embodiments of the present invention, and by way of non-limiting example, the electrostatic separation assembly may comprise a recirculation component, the recirculation component configured to facilitate the recirculation of at least a portion of the first sample through the electrostatic separation assembly. By way of non-limiting example, the recirculation component may be used when the first sample does not completely electrostatically separate in the separation chamber, and may be used several times to completely electrostatically separate the trichomes from the rest of the plant biomass. By way of additional non-limiting example, in such embodiments wherein the electrostatic separation assembly comprises a recirculation component, the resulting purity of the collected trichomes may be about 99.99%.

As previously noted, after the trichomes have been separated from the first sample, the trichomes need to be collected for any potential therapeutic, pharmaceutical, and/or nutraceutical applications. Accordingly, and in at least some embodiments of the present invention, the at least one electrode assembly may contain structural components that assist with the post-separation collection of trichomes. In particular, and by way of non-limiting example, the at least one electrode assembly may be "self-cleaning" and may comprise an electroconductive belt; a motor, the motor configured to facilitate movement of the electroconductive belt; and a scraper component, the scraper component configured to remove particulate matter from one or more faces of the at least one electrode assembly. By way of additional non-limiting example, in such embodiments wherein the at least one electrode assembly is "self-cleaning" in nature, the at least one electrode assembly may further comprise a rotating part and a transmission wheel. Moreover, by way of non-limiting example, the scraper component may be a non-conductive dielectric scraper, the non-conductive dielectric scraper specifically configured to recover particles attracted by electrostatic forces. By way of additional non-limiting example, the scraper component may be a brush.

In this regard, and by way of non-limiting example, in such embodiments wherein the at least one "self-cleaning" electrode assembly comprises a first "self-cleaning" electrode assembly and a second "self-cleaning" electrode assembly, the electroconductive belt of each of the "self-cleaning" electrode assemblies may rotate in the same direction with variable speed, or rotate in opposite directions with variable speed. In such embodiments wherein the electroconductive belt of the at least one "self-cleaning" electrode assembly rotates with variable speed, the speed of the electroconductive belt may be determined by the rate of accumulation of charged particulate matter on the surface of the electroconductive belt. Further, and by way of non-limiting example, in such embodiments wherein the speed of the electroconductive belt is determined by the rate of accumulation of charged particulate matter on the surface of the electroconductive belt, the at least one "self-cleaning" electrode assembly may have a separate motor drive—thereby allowing for independent control of the speed of the electroconductive belt(s)—and incorporated sensor technology—thereby allowing for purposes of fine-tuning the speed of the electroconductive belt(s).

In at least some embodiments wherein the at least one electrode assembly comprises a scraper component, as may be understood, the scraper component may continuously remove accumulated charged particulate matter from the surface of the electroconductive belt(s). By way of non-limiting example, the scraper component may be located at a distal (in relation to the injection component) end of the at least one electrode assembly.

The attendant method of the present invention includes the separation of glandular trichomes from a sample of plant biomass. Further, one or more embodiments of the present invention include a method comprising dispensing a first sample, the first sample comprising glandular trichomes; channeling the first sample through a pipeline component, the pipeline component configured to triboelectrically generate an electrostatic charge on the first sample; and injecting the first sample into a separation chamber comprising at least one electrode assembly, the separation chamber configured to facilitate the separation of the first sample.

By way of non-limiting example, the method of the present invention in one or more preferred embodiments further includes the preparation of the first sample; the pneumatic controlling of the flow of the first sample through the pipeline component via use of a flow regulation component; collecting the trichomes (for eventual use in potential therapeutic, pharmaceutical, and/or nutraceutical applications); and, optionally, recirculating at least a portion of the first sample through the electrostatic separation assembly to achieve complete separation.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
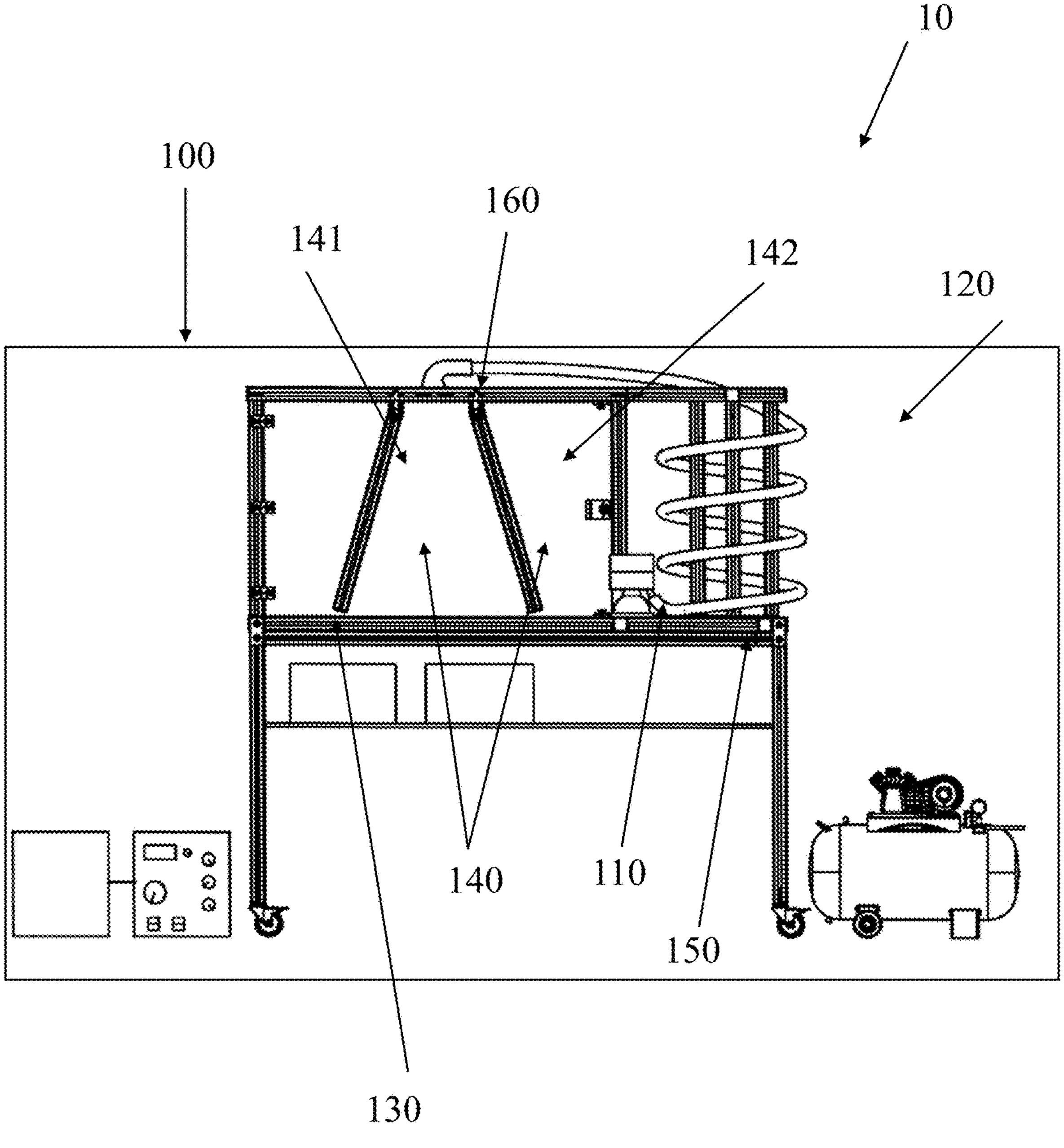
FIG. 1 depicts a schematic representation of an apparatus for electrostatic separation of glandular trichomes, in accordance with at least one embodiment of the present invention.
Figure 4:
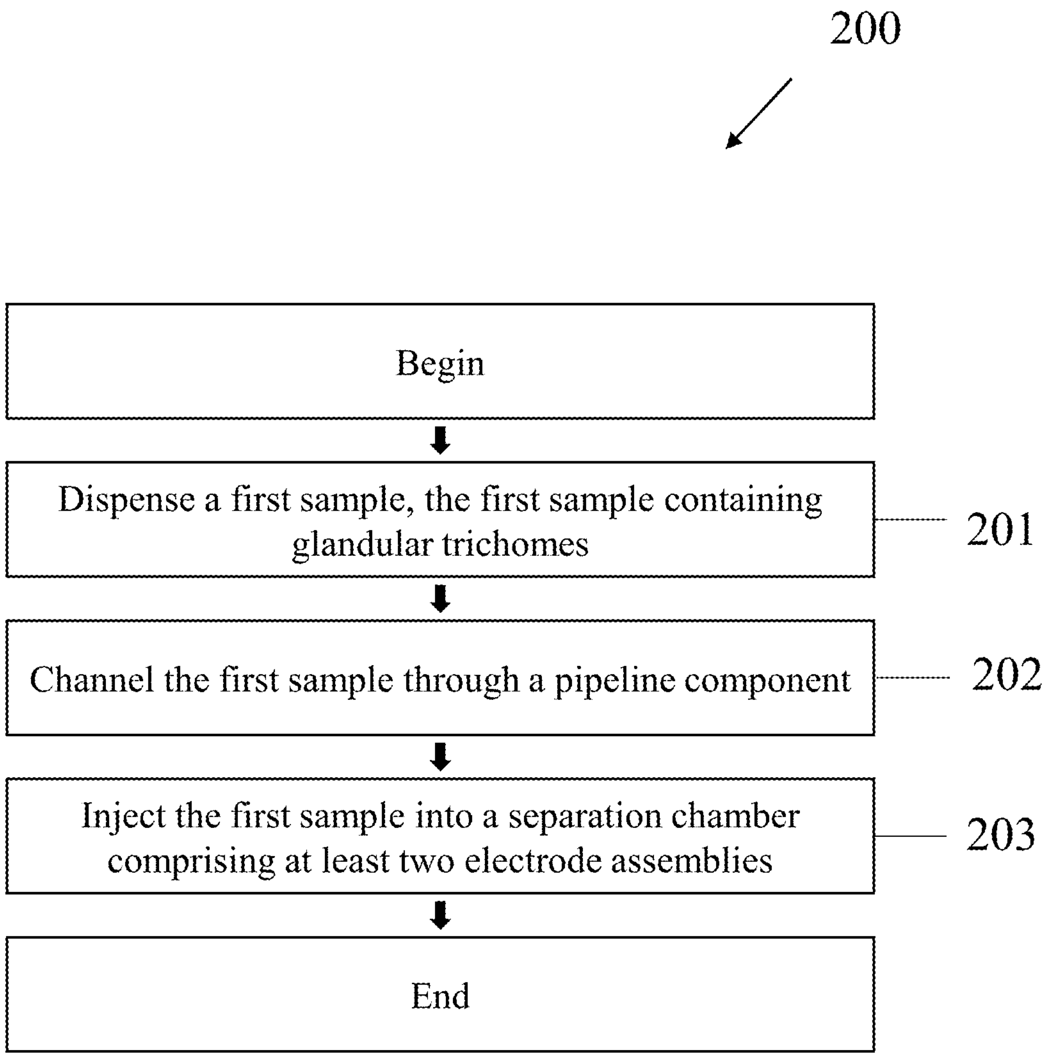
FIG. 4 is a schematic representation in block form representing at least one method embodiment of the present invention.
Figure 5:
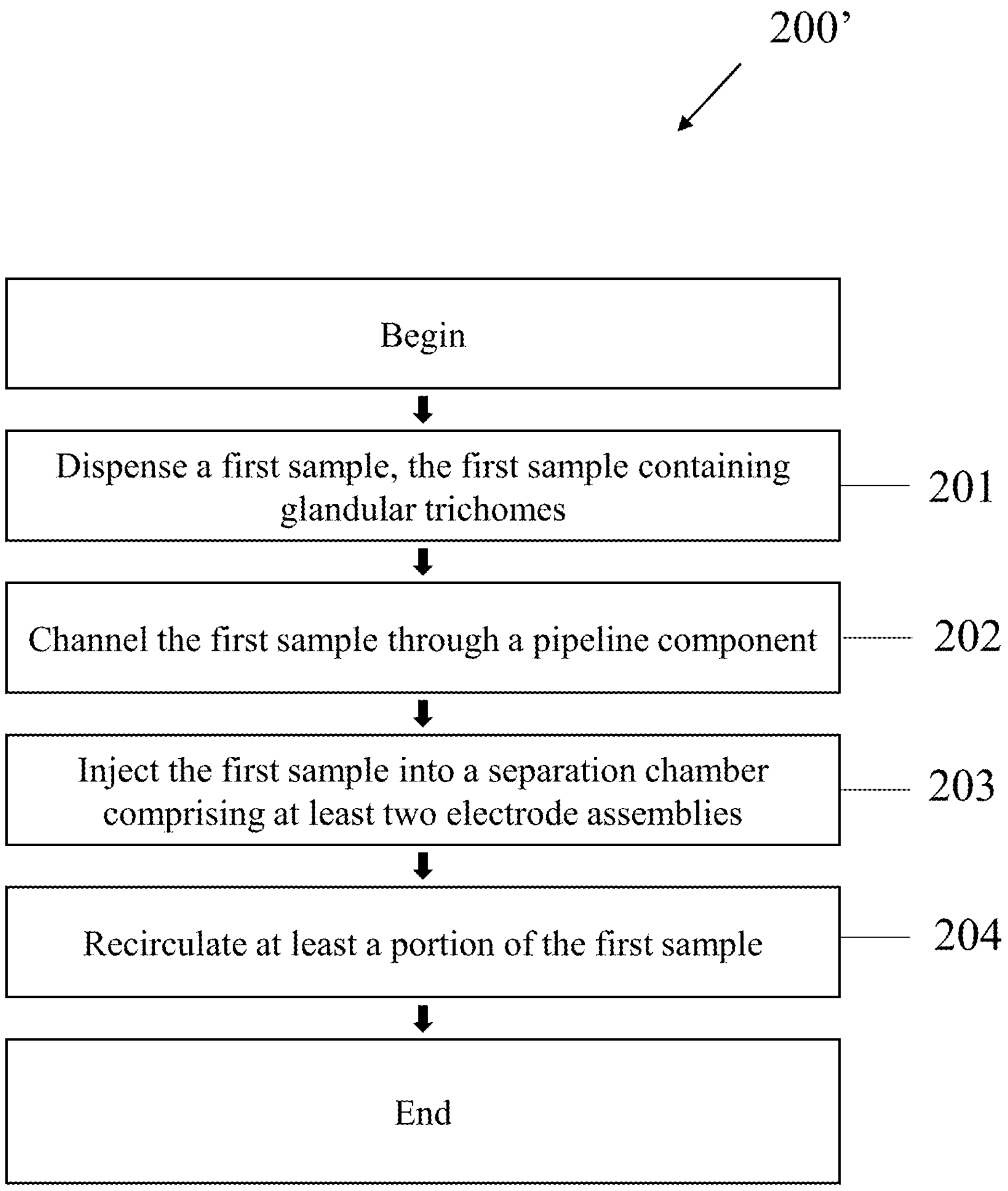
FIG. 5 is a schematic representation in block form representing at least one method embodiment of the present invention.

As represented throughout the accompanying figures, the present invention is directed to an apparatus for electrostatic separation of glandular trichomes generally indicated as 10 in at least FIG. 1 and the attendant methods for electrostatic separation of glandular trichomes, generally represented as 200 in FIGS. 4-5.

With initial reference to FIG. 1, the apparatus for electrostatic separation of glandular trichomes 10 may comprise an electrostatic separation assembly 100—the electrostatic separation assembly 100 generally configured to prepare a sample of plant biomass for electrostatic separation and perform the requisite electrostatic separation of the trichomes from the sample of plant biomass. Generally, and by way of non-limiting example, a plurality of electrostatic separation assemblies may be connected together—either in parallel, in series, or both—to achieve varying degrees of separation. Moreover, and by way of additional non-limiting example, the electrostatic separation assembly may be adapted for mobile use via incorporation of one or more electrostatic separation assembly into the framework of a motor vehicle.

With regard to the electrostatic separation assembly itself, also seen in FIG. 1, the electrostatic separation assembly 100 may comprise a dispensing component 110, the dispensing component 110 configured to dispense a first sample, the first sample comprising glandular trichomes. By way of non-limiting example, the dispensing component may be a vibrating dispenser, a jet sieve, a vacuum conveyor, or a cyclone feed.

With particular regard to the preparation of the first sample, however, the first sample May be prepared via exposing the sample of plant biomass to temperatures of ranging from about −20° C. to 20° C.—the temperature regulated by a device capable of heating and/or cooling—and a relative humidity—the relative humidity regulated by a device capable of humidifying and/or dehumidifying—ranging from about 30% to about 50%. Moreover, the first sample may further be prepared via application of a pressurized gas source, wherein the pressurized gas is selected from a plurality of gases including dry atmospheric air and dry inert gases. By way of non-limiting example, the first sample may comprise a particulate size ranging from about 20 to about 300 micrometers. By way of additional non-limiting example, the first sample's particulate size shall not exceed 300 micrometers—or, more preferably, 250 micrometers. By way of yet additional non-limiting example, the first sample's moisture content is monitored via sensor technologies for purposes of fine-tuning the preparation thereof. Accordingly, and in such embodiments wherein the first sample is prepared, upon completion of the preparation of the first sample, the first sample may be dispensed by the dispensing component.

The electrostatic separation assembly 100, seen in FIG. 1, may also comprise a pipeline component 120, the pipeline component 120 configured to triboelectrically generate an electrostatic charge on the first sample. By way of non-limiting examples, the pipeline component 120 may be structurally configured in a spiral arrangement and may be made of silicone, vinyl, fluoroethyl polymers, or polytetrafloral ethylene. In such embodiments wherein the pipeline component is structurally configured in a spiral arrangement, the pipeline component may direct the flow of the first sample therethrough in an intensified manner via circular aerodynamic flow. By way of additional non-limiting example, the pipeline component may triboelectrically generate an electrostatic charge on the first sample via frictional contact between particles of the first sample or via frictional contact between particles of the first sample and the material of the pipeline component.

In at least some embodiments of the present invention, seen in FIG. 1, the electrostatic separation assembly 100 may also comprise a flow regulation component 150, the flow regulation component 150 configured to pneumatically control the flow of the first sample through the pipeline component 120. In such embodiments wherein the electrostatic separation assembly comprises a flow regulation component, the flow regulation component may be selected from a plurality of flow regulation components comprising air flow regulators, vibrating feeders, and vacuum control devices. By way of non-limiting example, in such embodiments wherein the electrostatic separation assembly comprises a flow regulation component, the flow regulation component may vary the flow rate from about 0.1 mg/min to about 10,000 g/min. By way of additional non-limiting example, the flow regulation component may be controlled or actuated via use of an electronic signal.

Furthermore, and as seen in connection with FIG. 1, the electrostatic separation assembly 100 may comprise a separation chamber 130 comprising at least one electrode assembly 140, the separation chamber 130 configured to facilitate the separation of the first sample via generation of an electric field. By way of non-limiting example, seen in FIG. 1, the at least one electrode assembly 140 may be secured to the structural features of the separation chamber 130 in a variety of fashions, thereby allowing variability in the relative magnitudes of the resultant electric field. Moreover, and by way of non-limiting example, seen in FIG. 1, the at least one electrode assembly may be made of a conductive material and may comprise a first electrode assembly 141—the first electrode assembly 141 being positively or negatively charged—and a second electrode assembly 142—the second electrode assembly 142 being negatively charged. In such embodiments, the electrodes may be flat, curved, angled, or boxed, and the power source for the voltage may be supplied by electricity distribution lines, solar panels, wind turbines, batteries, power generators operated by fuel, and the like. By way of non-limiting examples, the voltage May comprise a variety of waveforms, such as sinusoidal, square, triangular, saw-tooth, or a mixture thereof; the voltage applied to the electrodes is at least about 3 kV and at most about 20 kV; and the frequency of the voltage applied is at least about 0 Hz and at most about 300 kHz. Further, in such embodiments wherein the at least one electrode assembly comprises a first electrode assembly and a second electrode assembly, the first electrode assembly may be oriented in an opposing arrangement, a symmetrical arrangement, or an asymmetrical arrangement with respect to the second electrode assembly; and the at least one electrode assembly may be coated in an insulating material, the insulating material selected from a plurality of insulating materials comprising electrical insulators, electrical semi-insulators, and dielectric materials. As may be understood, the generated electric field is inversely proportional to the distance between electrodes—and, as such, a parallel orientation is necessary to achieve a uniform electric field in the separation chamber.

Moreover, in at least some embodiments of the present invention, seen in FIG. 1, the electrostatic separation assembly 100 may also comprise an injection component 160, the injection component 160 configured to direct the first sample from the pipeline component 120 into the separation chamber 130. In some embodiments of the present invention, the injection component may be a flow straightener, the flow straightener configured to constrict flow of the first sample from a turbulent flow into a laminar flow at the point of injection into the separation chamber. As may be understood, the laminar flow of the first sample may be adjusted via the shape of the injection component (e.g., a 3-millimeter aperture) and the flow rate of the first sample. In this regard, the injection component may constrict the flow of the first sample into the separation chamber, wherein the first sample will, via gravitational forces, free-fall through the separation chamber—and, therefore, be subjected to the electric field produced by the at least one electrode assembly (i.e., negatively charged particles will be attracted to the positively charged electrode, and, in instances wherein a second electrode assembly is employed, vice versa).

After separation of the trichomes from the first sample, and as may be understood, the trichomes need to be collected for any potential therapeutic, pharmaceutical, and/or nutraceutical applications. In some embodiments of the present invention, the trichomes may be collected directly from one of the at least one electrode assembly (i.e., the electrode assembly that attracts the negatively charged trichomes). In such embodiments, the purity of the collected trichomes is about 95%. In other embodiments of the present invention, the trichomes may be collected via one or more collection bins, wherein the trichomes are manually or automatically released from the applied electric field and, via gravitational forces, fall into the one or more collection bins.

In yet additional embodiments of the present invention, and by way of non-limiting example, the electrostatic separation assembly may comprise a recirculation component, the recirculation component configured to facilitate the recirculation of at least a portion of the first sample through the electrostatic separation assembly. By way of non-limiting example, the recirculation component may be used when the first sample does not completely electrostatically separate in the separation chamber, and may be used several times to completely electrostatically separate the trichomes from the rest of the plant biomass. By way of additional non-limiting example, in such embodiments wherein the electrostatic separation assembly comprises a recirculation component, the resulting purity of the collected trichomes may be about 99.99%.

Figure 2:
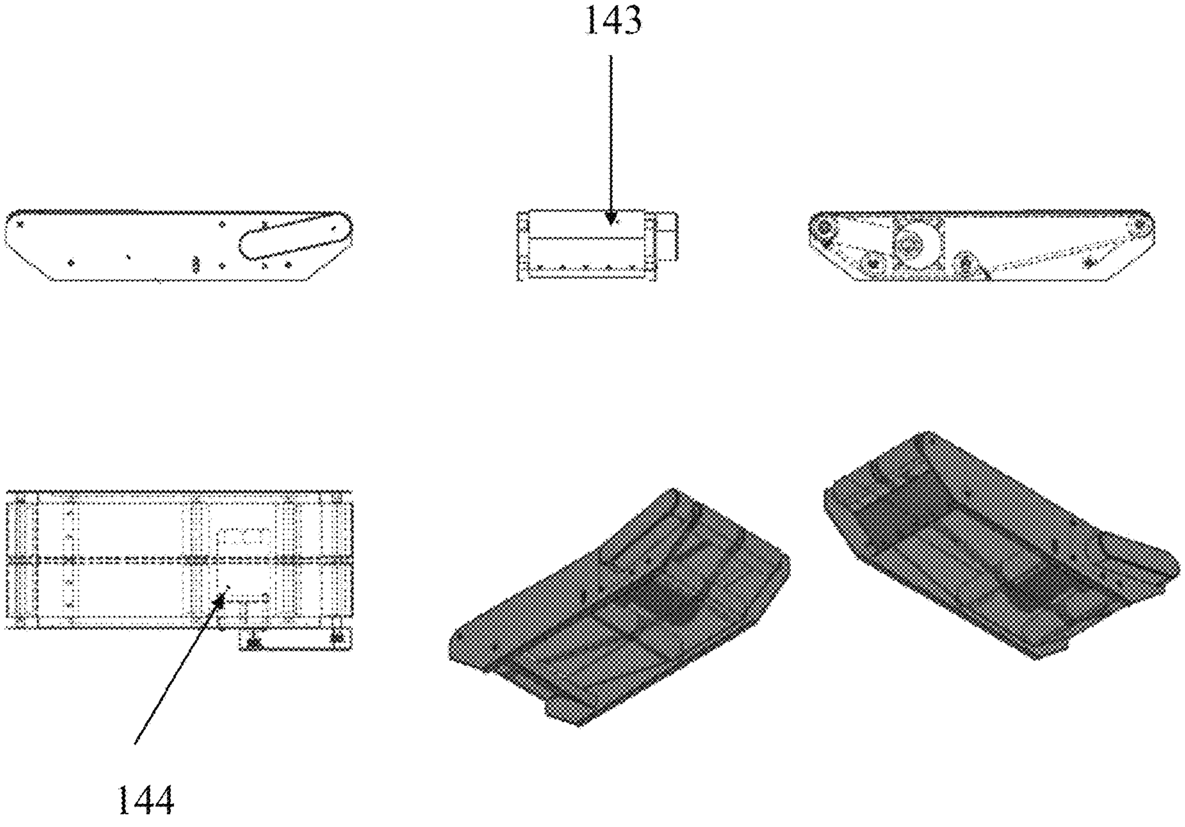
FIG. 2 depicts a schematic representation of one embodiment of the at least one electrode assembly, in accordance with at least one embodiment of the present invention.
Figure 3:
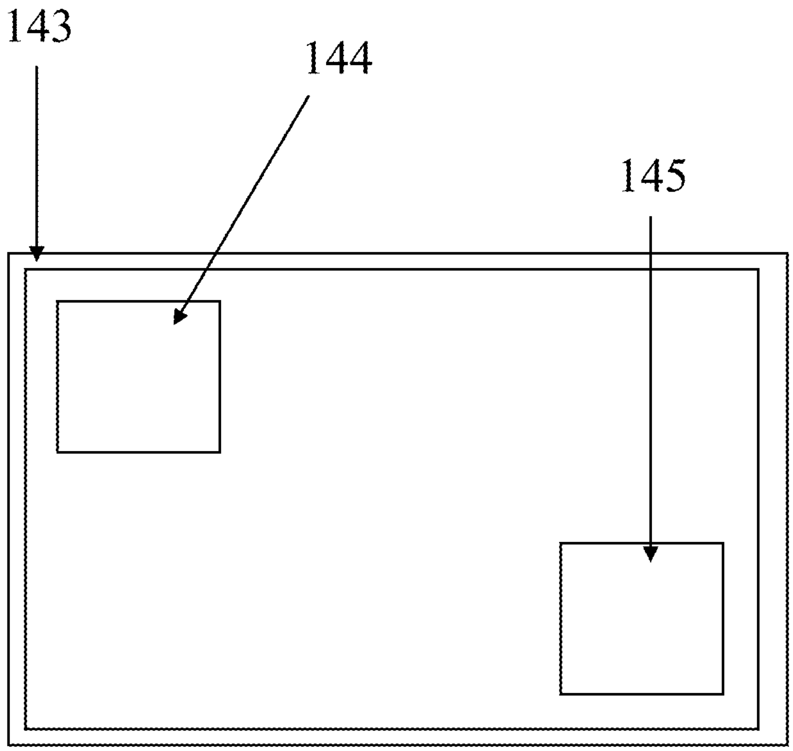
FIG. 3 depicts a schematic representation of an alternative embodiment of the at least one electrode assembly, in accordance with at least one embodiment of the present invention.

As previously noted, after the trichomes have been separated from the first sample, the trichomes need to be collected for any potential therapeutic, pharmaceutical, and/or nutraceutical applications. Accordingly, and in at least some embodiments of the present invention, the at least one electrode assembly may contain structural components that assist with the post-separation collection of trichomes. In particular, and by way of non-limiting example, seen in connection with FIGS. 2-3, the at least one electrode assembly may be "self-cleaning" and may comprise an electroconductive belt 143; a motor 144, the motor 144 configured to facilitate movement of the electroconductive belt 143; and a scraper component 145, the scraper component 145 configured to remove particulate matter from one or more faces of the at least one electrode assembly. By way of additional non-limiting example, in such embodiments wherein the at least one electrode assembly is "self-cleaning" in nature, the at least one electrode assembly may further comprise a rotating part and a transmission wheel. Moreover, by way of non-limiting example, the scraper component may be a non-conductive dielectric scraper, the non-conductive dielectric scraper specifically configured to recover particles attracted by electrostatic forces. By way of additional non-limiting example, the scraper component may be a brush.

In this regard, and by way of non-limiting example, in such embodiments wherein the at least one "self-cleaning" electrode assembly comprises a first "self-cleaning" electrode assembly and a second "self-cleaning" electrode assembly, the electroconductive belt of each of the "self-cleaning" electrode assemblies may rotate in the same direction with variable speed, or rotate in opposite directions with variable speed. In such embodiments wherein the electroconductive belt of the at least one "self-cleaning" electrode assembly rotates with variable speed, the speed of the electroconductive belt may be determined by the rate of accumulation of charged particulate matter on the surface of the electroconductive belt. Further, and by way of non-limiting example, in such embodiments wherein the speed of the electroconductive belt is determined by the rate of accumulation of charged particulate matter on the surface of the electroconductive belt, the at least one "self-cleaning" electrode assembly may have a separate motor drive—thereby allowing for independent control of the speed of the electroconductive belt(s)—and incorporated sensor technology—thereby allowing for purposes of fine-tuning the speed of the electroconductive belt(s).

In at least some embodiments wherein the at least one electrode assembly comprises a scraper component, as may be understood, the scraper component may continuously remove accumulated charged particulate matter from the surface of the electroconductive belt(s). By way of non-limiting example, the scraper component may be located at a distal (in relation to the injection component) end of the at least one electrode assembly.

The attendant method of the present invention 200 and 200', seen in FIGS. 4-5, includes the separation of glandular trichomes from a sample of plant biomass. Further, one or more embodiments of the present invention, seen in FIG. 4, include a method 200 comprising dispensing a first sample, the first sample comprising glandular trichomes 201; channeling the first sample through a pipeline component 202, the pipeline component configured to triboelectrically generate an electrostatic charge on the first sample; and injecting the first sample into a separation chamber comprising at least one electrode assembly 203, the separation chamber configured to facilitate the separation of the first sample.

By way of non-limiting example, and as seen in FIG. 5, the method 200' of the present invention in one or more preferred embodiments further includes the preparation of the first sample; the pneumatic controlling of the flow of the first sample through the pipeline component via use of a flow regulation component; collecting the trichomes (for eventual use in potential therapeutic, pharmaceutical, and/or nutraceutical applications); and, optionally, recirculating at least a portion of the first sample 204 through the electrostatic separation assembly to achieve complete separation.

Since many modifications, variations, and changes in detail may be made to the described preferred embodiment of the present invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An apparatus for electrostatic separation of glandular trichomes from a sample of trichome-bearing plant biomass including *cannabis*, hemp, or hops, comprising:
- an electrostatic separation assembly, said electrostatic separation assembly comprising:
  - a vibrating dispenser configured to dispense a first sample, said first sample comprising glandular trichomes and having a moisture content monitored by sensor technologies,
  - a spiral pipeline configured to pneumatically channel said first sample and triboelectrically generate an electrostatic charge on said first sample while directing said first sample in a circular aerodynamic flow to reduce particle agglomeration, and
  - a separation chamber comprising at least one electrode assembly configured to generate an electric field, said separation chamber configured to facilitate a separation of said first sample at a purity of at least 95% by weight.

2. The apparatus of claim 1, wherein said electrostatic separation assembly comprises a flow regulation component, said flow regulation component configured to pneumatically control the flow of said first sample through said pipeline component.

3. The apparatus of claim 2, wherein said flow regulation component is selected from a group of flow regulation components consisting of air flow regulators, vibrating feeders, and vacuum control devices.

4. The apparatus of claim 1, wherein said electrostatic separation assembly comprises an injection component, said injection component configured to direct said first sample from said pipeline component into said separation chamber.

5. The apparatus of claim 1, wherein said at least one electrode assembly comprises a first electrode assembly, said first electrode assembly configured to be positively or negatively charged.

6. The apparatus of claim 1, wherein said at least one electrode assembly comprises a first electrode assembly, said first electrode assembly being positively charged, and a second electrode assembly, said second electrode assembly being negatively charged.

7. The apparatus of claim 6, wherein said first electrode assembly is oriented in a parallel arrangement with respect to said second electrode assembly.

8. The apparatus of claim 1, wherein said at least one electrode assembly is coated in an insulating material, said insulating material selected from a group of insulating materials consisting of electrical insulators, electrical semi-insulators, and dielectric materials.

9. The apparatus of claim 1, wherein said electrostatic separation assembly comprises a recirculation component, said recirculation component configured to facilitate recirculation of at least a portion of said first sample through said electrostatic separation assembly.

10. An apparatus for electrostatic separation of glandular trichomes from a sample of trichome-bearing plant biomass including *cannabis*, hemp, or hops, comprising:
- an electrostatic separation assembly, said electrostatic separation assembly comprising:
  - a vibrating dispenser configured to dispense a first sample, said first sample comprising glandular trichomes and having a moisture content monitored by sensor technologies,
  - a spiral pipeline configured to pneumatically channel said first sample and triboelectrically generate an electrostatic charge on said first sample while directing said first sample in a circular aerodynamic flow to reduce particle agglomeration, and
  - a separation chamber comprising at least one electrode assembly configured to generate an electric field, said separation chamber configured to facilitate a separation of said first sample at a purity of at least 95% by weight,
  - said at least one electrode assembly comprising:
    - an electroconductive belt, and
    - a motor, said motor configured to facilitate movement of said electroconductive belt.

11. The apparatus of claim 10, wherein said electrostatic separation assembly comprises a flow regulation component, said flow regulation component configured to pneumatically control flow of said first sample through said pipeline component.

12. The apparatus of claim 10, wherein said electrostatic separation assembly comprises an injection component, said injection component configured to direct said first sample from said pipeline component into said separation chamber.

13. The apparatus of claim 10, wherein said at least one electrode assembly comprises a first electrode assembly, said first electrode assembly configured to be positively or negatively charged.

14. The apparatus of claim 10, wherein said at least one electrode assembly comprises a first electrode assembly, said first electrode assembly being positively charged, and a second electrode assembly, said second electrode assembly being negatively charged.

15. The apparatus of claim 10, wherein said at least one electrode assembly is coated in an insulating material, said insulating material selected from a group of insulating materials consisting of electrical insulators, electrical semi-insulators, and dielectric materials.

16. The apparatus of claim 10, wherein said at least one electrode assembly further comprises a scraper component.

17. The apparatus of claim 16, wherein said scraper component is a non-conductive dielectric scraper.

18. The apparatus of claim 10, wherein said electrostatic separation assembly comprises a recirculation component, said recirculation component configured to facilitate recirculation of at least a portion of said first sample through said electrostatic separation assembly.

19. A method for electrostatic separation of glandular trichomes from a sample of trichome-bearing plant biomass including *cannabis*, hemp, or hops, comprising:

dispensing a first sample using a vibrating dispenser, the first sample comprising glandular trichomes and having a moisture content monitored by sensor technologies, channeling the first sample through spiral pipeline configured to pneumatically direct said first sample in a circular aerodynamic flow and triboelectrically generate an electrostatic charge on the first sample while reducing particle agglomeration, and injecting the first sample into a separation chamber comprising at least one electrode assembly configured to generate an electric field, the separation chamber configured to facilitate a separation of said glandular trichomes from said first sample at a purity of at least 95% by weight.

20. The method as recited in claim 19, wherein the first sample comprises a particulate size ranging from about 20 to about 300 micrometers.

21. The method as recited in claim 19, wherein a flow regulation component pneumatically controls flow of the first sample through the pipeline component.

22. The method as recited in claim 19, wherein injecting the first sample into the separation chamber is performed via a flow straightener, the flow straightener configured to constrict flow of the first sample into a laminar flow.

23. The method as recited in claim 19, wherein the at least one electrode assembly comprises a first electrode assembly, said first electrode assembly configured to be positively or negatively charged.

24. The method as recited in claim 19, wherein the at least one electrode assembly comprises a first electrode assembly, said first electrode assembly being positively charged, and a second electrode assembly, said second electrode assembly being negatively charged.

25. The method as recited in claim 19, further comprising recirculating at least a portion of the first sample.

* * * * *